(12) United States Patent
Liu et al.

(10) Patent No.: US 11,081,726 B2
(45) Date of Patent: Aug. 3, 2021

(54) SOLID STATE ELECTROLYTE AND SOLID STATE BATTERY

(71) Applicant: Industrial Technology Research Institute, Hsinchu (TW)

(72) Inventors: Chia-Erh Liu, Hsinchu County (TW); Shih-Chieh Liao, Taoyuan (TW); Shu-Ghun Yu, Taipei (TW); Jin-Ming Chen, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 275 days.

(21) Appl. No.: 16/261,580

(22) Filed: Jan. 30, 2019

(65) Prior Publication Data

US 2019/0237800 A1    Aug. 1, 2019

Related U.S. Application Data

(60) Provisional application No. 62/624,060, filed on Jan. 30, 2018.

(51) Int. Cl.
*H01M 10/0562* (2010.01)
*H01M 10/0585* (2010.01)

(52) U.S. Cl.
CPC ... *H01M 10/0562* (2013.01); *H01M 10/0585* (2013.01); *H01M 2300/0071* (2013.01);
(Continued)

(58) Field of Classification Search
CPC ......... H01M 10/0562; H01M 10/0585; H01M 2300/0071; H01M 2300/0082;
(Continued)

(56) References Cited

U.S. PATENT DOCUMENTS

| 9,034,525 B2 | 5/2015 | Babic et al. |
| 2011/0053001 A1 | 3/2011 | Babic et al. |

(Continued)

FOREIGN PATENT DOCUMENTS

| CN | 102769147 | 11/2012 |
| CN | 102856584 | 1/2013 |

(Continued)

OTHER PUBLICATIONS

"Office Action of Japan Counterpart Application," dated Jan. 7, 2020, p. 1-p. 5.

(Continued)

*Primary Examiner* — Carlos Barcena
(74) *Attorney, Agent, or Firm* — JCIPRNET (57) ABSTRACT

A solid state electrolyte having a garnet type crystal structure is provided. The chemical composition of the solid state electrolyte includes lithium, lanthanum, zirconium, oxygen, and sulfur. The content of sulfur in the solid state electrolyte is between 5 mol % and 35 mol % based on the content of oxygen in the solid state electrolyte. A solid state battery including a positive electrode layer, a negative electrode layer, and a solid state electrolyte layer is also provided. The solid state electrolyte layer is disposed between the positive electrode layer and the negative electrode layer. The solid state electrolyte layer includes the solid state electrolyte.

17 Claims, 5 Drawing Sheets

(52) U.S. Cl.
CPC ............... *H01M 2300/0082* (2013.01); *H01M 2300/0091* (2013.01)

(58) Field of Classification Search
CPC .. H01M 2300/0091; H01M 4/13; H01M 4/62; H01M 4/623
See application file for complete search history.

(56) References Cited

U.S. PATENT DOCUMENTS

| | | | |
|---|---|---|---|
| 2015/0044575 | A1 | 2/2015 | Kawaji et al. |
| 2015/0180001 | A1 | 6/2015 | Johnson et al. |
| 2017/0125842 | A1* | 5/2017 | Meguro ............ H01M 10/0525 |
| 2019/0280330 | A1 | 9/2019 | Albano |

FOREIGN PATENT DOCUMENTS

| | | | | |
|---|---|---|---|---|
| CN | 102867985 | | 1/2013 | |
| CN | 103460502 | | 12/2013 | |
| CN | 103904360 | | 7/2014 | |
| CN | 104659412 | | 5/2015 | |
| CN | 102769147 | * | 7/2015 | ........ H01M 10/0562 |
| CN | 105409051 | | 3/2016 | |
| CN | 105977527 | | 9/2016 | |
| CN | 106537676 | | 3/2017 | |
| JP | 2014529327 | | 11/2014 | |
| JP | 2015035334 | | 2/2015 | |
| JP | 2015050072 | | 3/2015 | |
| JP | 2017529645 | | 10/2017 | |
| JP | 2018073805 | | 5/2018 | |
| TW | 201445795 | | 12/2014 | |
| TW | 201527256 | | 7/2015 | |
| TW | 201806226 | | 2/2018 | |
| WO | 2016168691 | | 10/2016 | |
| WO | 2017033765 | | 3/2017 | |

OTHER PUBLICATIONS

"Office Action of Japan Counterpart Application", dated Jul. 7, 2020, p. 1-p. 4.

"Office Action of Taiwan Counterpart Application," dated Oct. 18, 2019, p. 1-p. 4.

"Office Action of China Counterpart Application", dated Dec. 29, 2020, p. 1-p. 7.

"Office Action of China Counterpart Application", dated May 17, 2021, p. 1-p. 6.

* cited by examiner

SOLID STATE ELECTROLYTE AND SOLID STATE BATTERY

CROSS-REFERENCE TO RELATED APPLICATION

This application claims the priority benefit of U.S. Provisional Application No. 62/624,060, filed on Jan. 30, 2018. The entirety of the above-mentioned patent application is hereby incorporated by reference herein and made a part of this specification.

TECHNICAL FIELD

This disclosure is related to a solid state electrolyte and a solid state battery.

BACKGROUND

At present, commercial lithium batteries are still mainly based on the use of liquid state electrolytes, but such batteries have some safety problems. Thus, if the conventional liquid state electrolytes can be replaced by solid state electrolytes, not only the safety problems of the batteries can be improved, but also the design of the battery structure will be more flexible. At the same time, the energy density of the battery can also be effectively increased to meet the demand for the energy density of the lithium battery in the market. However, since the solid state electrolyte is limited by grain boundary hindrance, a migration rate of lithium ions in the solid state electrolyte cannot be increased, resulting in low conductivity of the solid state electrolyte and failing to meet practical requirements. Therefore, how to improve the conductivity of the solid state electrolyte is the focus of the current research and development in the industry.

SUMMARY

A solid state electrolyte of the present disclosure has a garnet type crystal structure, wherein a chemical composition of the solid state electrolyte includes lithium (Li), lanthanum (La), zirconium (Zr), oxygen (O), and sulfur (S). A content of sulfur in the solid state electrolyte is between 5 mol % and 35 mol % based on a content of oxygen in the solid state electrolyte.

A solid state battery of the present disclosure includes a positive electrode layer, a negative electrode layer, and a solid state electrolyte layer. The solid state electrolyte layer is disposed between the positive electrode layer and the negative electrode layer. The solid state electrolyte layer includes the solid state electrolyte.

To make the present disclosure more comprehensible and obvious, the embodiments are described below in detail with reference to the accompanying drawings.

DESCRIPTION OF THE EMBODIMENTS

Reference is made to the following examples and accompanying drawings for a more complete understanding of the disclosure, but the disclosure may be practiced in many different forms and should not be construed as limited to the embodiments set forth herein. For ease of understanding, the same elements in the following description will be denoted by the same reference numerals. In the drawings, for the sake of clarity, the components and their relative sizes may not be drawn to scale.

In the specification, scopes represented by "a numerical value to another numerical value" are schematic representations in order to avoid listing all of the numerical values in the scopes in the specification. Therefore, the recitation of a specific numerical range covers any numerical value in the numerical range and a smaller numerical range defined by any numerical value in the numerical range, as is the case with any numerical value and a smaller numerical range thereof in the specification.

Hereinafter, embodiments are provided to further describe the disclosure, but the embodiments are only exemplary and are not intended to limit the scope of the disclosure.

[Solid State Electrolyte]

In some embodiments, the disclosure provides a solid state electrolyte having a garnet type crystal structure, wherein a chemical composition of the solid state electrolyte includes lithium, lanthanum, zirconium, oxygen, and sulfur. In some embodiments, the solid state electrolyte is a sulfur-doped oxide solid state electrolyte, for example, and sulfur as a dopant may be, for example, elemental sulfur (S), and distributed in a crystal grain of the solid state electrolyte. Specifically, since a radius of elemental sulfur is similar to a radius of elemental oxygen, sulfur added into the solid state electrolyte may partially replace oxygen to form the sulfur-doped oxide solid state electrolyte. In some embodiments, a proportion of original oxygen replaced by sulfur in the oxide solid state electrolyte is 5 mol % to 25 mol %. In some embodiments, a content of sulfur in the solid state electrolyte is between 5 mol % and 35 mol % based on a content of oxygen in the solid state electrolyte, but the disclosure is not limited thereto. In another embodiment, the content of sulfur in the solid state electrolyte is between 5 mol % and 25 mol % based on the content of oxygen in the solid state electrolyte.

It should be noted that, in the case that the content of sulfur in the solid state electrolyte is between 5 mol % and 35 mol %, the formed sulfur-doped oxide solid state electrolyte may have a good conductivity. Particularly, when the content of sulfur is between 5 mol % and 35 mol %, a lattice constant of the solid state electrolyte will change. Thereby, a diffusion rate of lithium ions in the solid state electrolyte is improved, and the conductivity of the solid state electrolyte is increased. On the contrary, when the molar percentage of the content of sulfur is too low (less than 5 mol %), the content of sulfur may not be enough to change the lattice constant of the solid state electrolyte. Thus, the migration rate of the lithium ions in the grain boundary in the solid state electrolyte cannot be improved, and the conductivity of the solid state electrolyte cannot be increased. Besides, when the molar percentage of the content of sulfur is too high (more than 35 mol %), it may cause precipitation of other crystal phases, which hinders a migration path of the lithium ions in the grain boundary of the solid state electrolyte. Thereby, the migration rate of the lithium ions in the solid state electrolyte is reduced, and the conductivity of the solid state electrolyte is decreased. Therefore, the doping amount of sulfur should be within an appropriate range, so that the migration rate of the lithium ions in the solid state electrolyte can be improved, so as to improve the conductivity of the solid state electrolyte.

It should be noted that, in the solid state electrolyte of the disclosure, since the partial oxygen is replaced by the doping of sulfur, the conductivity of the formed sulfur-doped oxide solid state electrolyte is improved, and the original crystal structure and chemical stability are still maintained. That is, the solid state electrolyte of the disclosure may have good chemical stability and conductivity at the same time.

In some embodiments, the solid state electrolyte, for example, has a chemical formula represented by formula 1:

$$M_{7-x}M'_3M''_{2-x}M'''_xO_{12-y}S_y \qquad \text{formula 1,}$$

wherein M is lithium (Li), M' is lanthanum (La), M'' is zirconium (Zr), M''' is tantalum (Ta), barium (Ba), gallium (Ga), or aluminum (Al), x=0 to 0.5, and y=0.6 to 3. In some embodiments, the oxide solid state electrolyte for doping sulfur includes, for example, lithium lanthanum zirconium oxide (LLZO), tantalum-doped lithium lanthanum zirconium oxide (LLZTO), or a combination thereof. For instance, when x=0, the oxide solid state electrolyte is, for example, lithium lanthanum zirconium oxide (LLZO); when 0<x≤0.5, and M''' is Ta, the oxide solid state electrolyte is, for example, tantalum-doped lithium lanthanum zirconium oxide (LLZTO), but the disclosure is not limited thereto. In other embodiments, M''' may also include, for example, other metals, such as barium (Ba), gallium (Ga), or aluminum (Al).

In some embodiments, the solid state electrolyte is, for example, doped with elemental sulfur therein by a solid sintering method, so as to form the sulfur-doped oxide solid state electrolyte of the disclosure. For instance, the method of doping elemental sulfur into the solid state electrolyte is to mix a raw material of the solid state electrolyte with a certain amount of elemental sulfur after being prepared according to a stoichiometric ratio, and then elemental sulfur is doped into the solid state electrolyte by the solid sintering method, wherein the type and the stoichiometric ratio of the raw material of the solid state electrolyte may be adjusted according to the requirements. In a particular embodiment, when the solid state electrolyte is, for example, a tantalum-doped lithium lanthanum zirconium oxide (LLZTO), the raw material may include lithium hydroxide (LiOH), lanthanum oxide (La$_2$O$_3$), zirconia (ZrO$_2$), and tantalum oxide (Ta$_2$O$_5$). Specifically, first, after the aforementioned raw materials are prepared according to a stoichiometric ratio, they are mixed with a certain amount of elemental sulfur to obtain a dried precursor powder containing elemental sulfur. Then, the dried precursor powder containing elemental sulfur is added into alcohol or isopropyl alcohol (IPA), and all materials are uniformly mixed by a mechanical grinding method to obtain a precursor slurry. In some embodiments, the mechanical grinding method includes a ball-milling method, a vibration grinding method, a turbine grinding method, a mechanical melting method, a disc grinding method, or other suitable grinding methods, for example. Then, the precursor slurry is dried to obtain the dried precursor powder. At last, the dried precursor powder may form the sulfur-doped oxide solid state electrolyte by the solid sintering method. It should be noted that, if the precursor powder containing elemental sulfur or lithium sulfide is directly subjected to the solid sintering method in an atmospheric environment, the generation of sulfur dioxide (SO$_2$) may cause sulfur loss. Thus, in some embodiments of the disclosure, the solid sintering method is carried out in a nitrogen atmosphere, the sintering temperature is, for example, between 800° C. and 950° C., and the sintering time is, for example, between 2 hours and 12 hours. After the precursor powder containing elemental sulfur is sintered at a high temperature, elemental sulfur may be doped into the crystal of the solid state electrolyte during the sintering process, and the solid state electrolyte formed by the solid sintering method has a cubic phase structure of garnet type materials.

In some embodiments, the solid state electrolyte is in powder form, for example. In some embodiments, a particle size of the solid state electrolyte is between 3 μm and 10 μm, for example, but the disclosure is not limited thereto. In other words, the solid state electrolyte powder may be further ground to the required particle size according to the requirements. In some embodiments, the conductivity of the solid state electrolyte is between 10$^{-4}$ S/cm and 10$^{-3}$ S/cm, for example, between 10$^{-4}$ S/cm and 5×10$^{-4}$ S/cm, for example.

[Solid State Battery]

Figure 1:
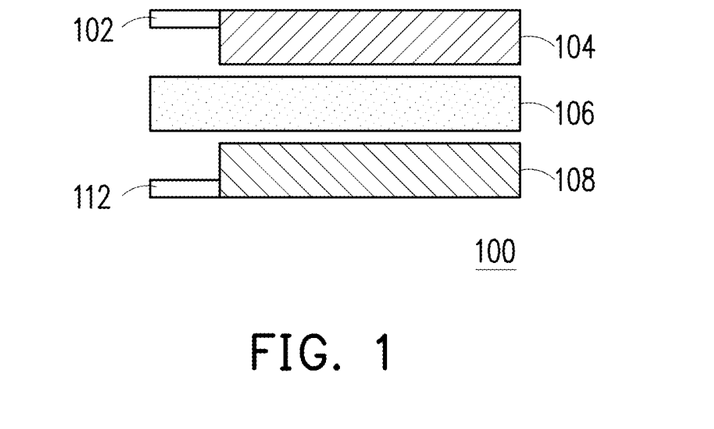
FIG. 1 is a schematic cross-sectional view of a solid state battery according to an embodiment of the disclosure.

FIG. 1 is a schematic cross-sectional view of a solid state battery according to an embodiment of the disclosure.

Referring to FIG. 1, a solid state battery 100 of the present embodiment includes a positive electrode layer 104, a negative electrode layer 108, and a solid state electrolyte layer 106. The solid state electrolyte layer 106 is disposed between the positive electrode layer 104 and the negative electrode layer 108.

In some embodiments, the positive electrode layer 104 includes, for example, a positive electrode active material known for use in the solid state battery, such as lithium-containing oxide (e.g., lithium cobalt oxide (LiCoO$_2$), lithium manganese oxide (LiMnO$_2$), lithium vanadium oxide (LiVO$_2$), lithium chromium oxide (LiCrO$_2$), lithium nickel oxide (LiNiO$_2$), lithium nickel cobalt aluminum oxide (LiNiCoAlO$_2$), and other transition metal oxides, or lithium iron phosphate (LiFePO$_4$)). In some embodiments, the negative electrode layer 108 includes, for example, a negative electrode active material known for use in the solid state battery, such as carbon active material (e.g., graphite), oxide active material, (e.g., transition metal oxide), or metal active material (e.g., lithium-containing metal active material, lithium-related alloy material, indium-containing metal active material, tin-containing metal active material).

In some embodiments, the solid state electrolyte layer 106 includes the aforementioned solid state electrolyte, for example. Specifically, the solid state electrolyte layer 106 includes the aforementioned sulfur-doped oxide solid state electrolyte, which can be used as a medium for transferring carriers (e.g., lithium ions) between the positive electrode layer 104 and the negative electrode layer 108. In some embodiments, the solid state electrolyte layer 106 may further include a binder or an organic solid state electrolyte. The binder includes polyvinylidene difluoride (PVDF), polytetrafluoroethylene (PTFE), or a combination thereof, for example. The organic solid state electrolyte includes poly(ethylene oxide) (PEO), polyphenylene oxide (PPO), polysiloxane, acrylate, or a combination thereof, for example, but the disclosure is not limited thereto. In some embodiments, the solid state electrolyte layer 106 includes an organic/inorganic composite solid state electrolyte formed by mixing the aforementioned sulfur-doped oxide solid state electrolyte and the binder or the organic solid state electrolyte, for example. The conductivity of the solid state electrolyte layer 106 is between $8 \times 10^{-5}$ S/cm and $10^{-3}$ S/cm, for example, between $10^{-4}$ S/cm and $10^{-3}$ S/cm or between $10^{-4}$ S/cm and $5 \times 10^{-4}$ S/cm. In a particular embodiment, the aforementioned organic/inorganic composite solid state electrolyte may be coated on the positive electrode layer 104 (or the negative electrode layer 108) to form a coating layer (i.e., the solid state electrolyte layer 106). Then, the negative electrode layer 108 (or the positive electrode layer 104) is stacked on the coating layer and pressed in a stacking direction to be fixed. A laminated structure of the positive electrode layer 104, the solid state electrolyte layer 106, and the negative electrode layer 108 can be formed in sequence, but the disclosure is not limited thereto.

In other embodiments, at least one of the positive electrode layer 104 and the negative electrode layer 108 may also include the aforementioned sulfur-doped oxide solid state electrolyte. That is, in the present embodiment, when the positive electrode layer 104 or the negative electrode layer 108 is formed, the aforementioned solid state electrolyte may be mixed with the positive electrode active material or the negative electrode active material. Thus, the formed positive electrode layer 104 or the negative electrode layer 108 may include the aforementioned solid state electrolyte. Since the positive electrode layer 104 or the negative electrode layer 108 includes the aforementioned sulfur-doped oxide solid state electrolyte, the interface compatibility between the solid state electrolyte and the positive electrode layer 104 or between the solid state electrolyte and the negative electrode layer 108 can be improved. The formation of the interface layer is inhibited, and the interface resistance is reduced, so that the overall electrical performance of the solid state battery 100 is better.

Referring to FIG. 1, the solid state battery 100 may further include a positive electrode current collector 102 and a negative electrode current collector 112. The suitable materials, thicknesses, shapes, etc. of the positive electrode current collector 102 and the negative electrode current collector 112 may be selected according to the intended use. Other detailed manufacturing steps of the solid state battery 100 are well known in the art and will not be described herein. It should be noted that, the aforementioned embodiments are only exemplary and are not intended to limit the scope of the disclosure.

The sulfur-doped oxide solid state electrolyte provided by the disclosure can be used to replace a separation membrane and an electrolyte in the lithium battery using liquid electrolytes currently, so as to be the medium for transferring the carriers between the positive electrode layer and the negative electrode layer in the lithium battery. In the solid state battery of the disclosure, by the doping of elemental sulfur, the migration rate of the lithium ions in the solid state electrolyte can be increased, thereby improving the conductivity of the solid state electrolyte. At the same time, the solid state electrolyte can still maintain good chemical stability, so as to achieve practical purpose.

EXPERIMENT

The disclosure is more specifically described in the following with reference to experimental examples. Although the following experiments are described, the materials used and the amount and ratio thereof, as well as handling details and handling process, etc., may be suitably modified without exceeding the scope of the disclosure. Accordingly, restrictive interpretation should not be made to the disclosure based on the experiments described below.

Experiment 1

Figure 2:
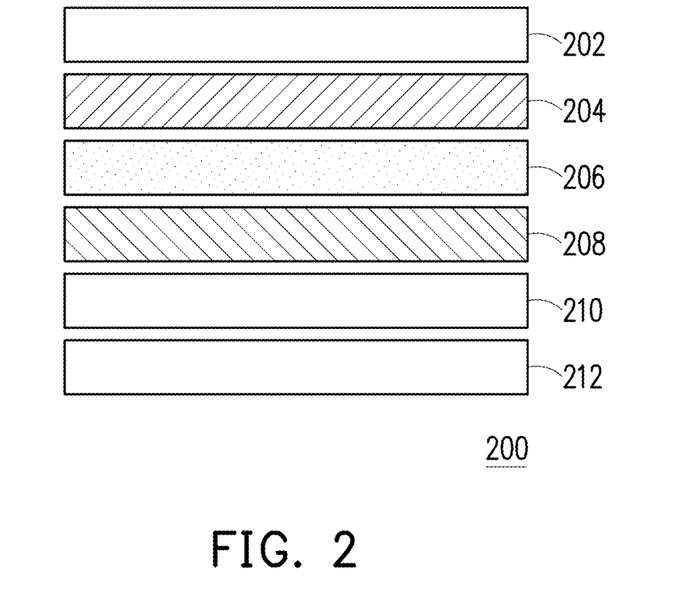
FIG. 2 is a schematic structural view of a test unit for an AC impedance analysis method of the disclosure.
Figure 3:
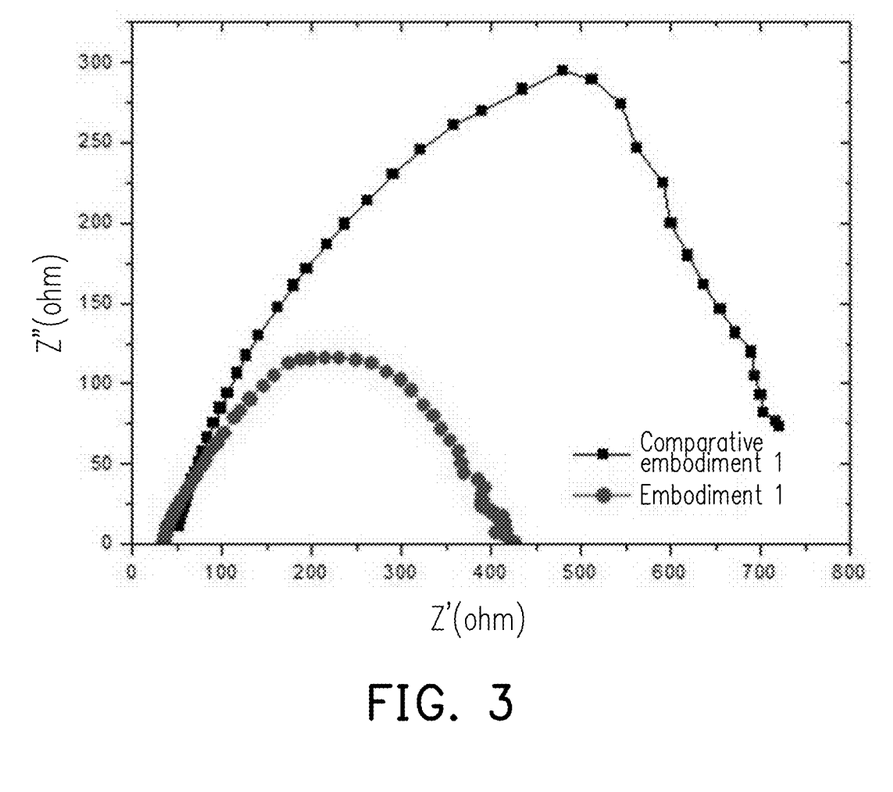
FIG. 3 is an AC impedance analysis diagram of the test unit prepared in Embodiment 1 and Comparative embodiment 1 of the disclosure.

FIG. 2 is a schematic structural view of a test unit for an AC impedance analysis method of the disclosure. FIG. 3 is an AC impedance analysis diagram of the test unit prepared in Embodiment 1 and Comparative embodiment 1 of the disclosure. Hereinafter, referring to FIG. 2 and FIG. 3 to illustrate the characteristics of the solid state electrolyte of the disclosure.

Embodiment 1

Lithium hydroxide (LiOH), lanthanum oxide ($La_2O_3$), zirconia ($ZrO_2$), and tantalum oxide ($Ta_2O_5$) were mixed with lithium sulfide (LiS) (the aforementioned raw materials were prepared according to the proportion of x=0.1 and y=0.65 in formula 1), 500 g of isopropyl alcohol (IPA) was added, and were ground by a ball-milling method for 24 hours. After the aforementioned materials were uniformly mixed, a precursor slurry was obtained. Then, the precursor slurry was dried to obtain a dried precursor powder. Thereafter, the dried precursor powder was placed in an alumina crucible and sintered at a temperature of 950° C. in a nitrogen atmosphere for 6 hours. The obtained powder was the sulfur-doped tantalum-doped lithium lanthanum zirconium oxide (LLZTO) solid state electrolyte powder (the content of sulfur is 5.73 mol % based on a content of oxygen).

Embodiment 2

The sulfur-doped tantalum-doped lithium lanthanum zirconium oxide (LLZTO) solid state electrolyte powder of Embodiment 2 was manufactured according to the manufacturing process similar to that of Embodiment 1, and the difference therebetween is that, in Embodiment 2, each raw material was prepared according to the proportion of x=0.1 and y=1.2 in formula 1. Thus, the obtained powder after sintering was the sulfur-doped tantalum-doped lithium lanthanum zirconium oxide (LLZTO) solid state electrolyte powder (the content of sulfur is 11.11 mol % based on a content of oxygen).

Embodiment 3

The sulfur-doped tantalum-doped lithium lanthanum zirconium oxide (LLZTO) solid state electrolyte powder of Embodiment 3 was manufactured according to the manufacturing process similar to that of Embodiment 1, and the difference therebetween is that, in Embodiment 3, each raw material is prepared according to the proportion of x=0.1 and y=3 in formula 1. Thus, the obtained powder after sintering was the sulfur-doped tantalum-doped lithium lanthanum zirconium oxide (LLZTO) solid state electrolyte powder (the content of sulfur is 33.33 mol % based on a content of oxygen).

Embodiment 4

The sulfur-doped lithium lanthanum zirconium oxide (LLZO) solid state electrolyte powder of Embodiment 4 was manufactured according to the manufacturing process similar to that of Embodiment 1, and the difference therebetween is that, in Embodiment 4, tantalum oxide was not included in the raw material. That is, the raw material in Embodiment 4 was prepared according to the proportion of x=0 and y=0.65 in formula 1. Thus, the obtained powder after sintering was the sulfur-doped lithium lanthanum zirconium oxide (LLZO) solid state electrolyte powder (the content of sulfur is 5.73 mol % based on a content of oxygen).

Comparative Embodiment 1

The tantalum-doped lithium lanthanum zirconium oxide (LLZTO) solid state electrolyte powder of Comparative embodiment 1 was manufactured according to the manufacturing process similar to that of Embodiment 1, and the difference therebetween is that, in Comparative embodiment 1, lithium sulfide was not included in the raw material. Thus, the obtained powder after sintering was the sulfur-undoped tantalum-doped lithium lanthanum zirconium oxide (LLZTO) solid state electrolyte powder (without sulfur).

Comparative Embodiment 2

The lithium lanthanum zirconium oxide (LLZO) solid state electrolyte powder of Comparative embodiment 2 was manufactured according to the manufacturing process similar to that of Embodiment 4, and the difference therebetween is that, in Comparative embodiment 2, lithium sulfide was not included in the raw material. Thus, the obtained powder after sintering was the sulfur-undoped lithium lanthanum zirconium oxide (LLZO) solid state electrolyte powder (without sulfur).

Conductivity Test

The conductivity of the aforementioned solid state electrolyte was tested by the AC impedance analysis method. First, the solid state electrolyte powder of Embodiment 1 and Comparative embodiment 1 were mixed with ethoxylated trimethylolpropane triacrylate (ETPTA) after sintering, wherein the weight percentage of the solid state electrolyte powder to ETPTA was 30 wt %:70 wt %. Then, polymerization was carried out by irradiating UV light, so as to form a solid state electrolyte film (layer). Thereafter, referring to FIG. 2, an ingot test unit 200 as shown in FIG. 2 was formed, and an AC impedance analysis was performed. The ingot test unit 200 was composed of an upper cover 202, a lithium metal 204, an ingot solid state electrolyte 206, a lithium metal 208, a gasket 210, and a lower cover 212 in sequence.

Referring to FIG. 3, after converting the results of AC impedance analysis, the conductivity of the solid state electrolyte film (the content of sulfur is 5.73 mol %) of Embodiment 1 is $1.3 \times 10^{-4}$ S/cm, and the conductivity of the solid state electrolyte film (without sulfur) of Comparative embodiment 1 is $6.4 \times 10^{-5}$ S/cm. That is, the conductivity of the sulfur-doped solid state electrolyte film is about twice that of the sulfur-undoped solid state electrolyte film. The conductivity of the sulfur-doped solid state electrolyte is significantly higher than that of the sulfur-undoped solid state electrolyte.

Experiment 2

FIG. 4A to FIG. 4D are capacitance-voltage (C-V) curve diagrams of the solid state batteries of Example 1 to Example 4 of the disclosure respectively. FIG. 5A and FIG. 5B are capacitance-voltage curve diagrams of the solid state batteries of Comparative example 1 and Comparative example 2 of the disclosure respectively. Hereinafter, referring to FIG. 1, FIG. 4A to FIG. 4D, and FIG. 5A and FIG. 5B to illustrate the characteristics of the solid state battery of the disclosure, wherein the solid state battery of each example will be analyzed for the capacitance-voltage (C-V) characteristic curve.

Example 1

The solid state battery as shown in FIG. 1 was prepared, wherein the positive electrode layer was lithium iron manganese phosphate ($LiFeMnPO_4$, LFMP), the negative electrode layer was lithium metal (Li), and the solid state electrolyte layer was composed of the sulfur-doped tantalum-doped lithium lanthanum zirconium oxide (LLZTO) solid state electrolyte powder (the content of sulfur is 5.73 mol %) obtained in the aforementioned Embodiment 1. The weight percentage of the sulfur-doped tantalum-doped lithium lanthanum zirconium oxide (LLZTO) solid state electrolyte powder to ETPTA was 30 wt %:70 wt %.

Example 2

The solid state battery of Example 2 was manufactured according to the manufacturing process similar to that of Example 1, and the difference therebetween is that, in Example 2, the solid state electrolyte layer in the solid state battery was composed of the sulfur-doped tantalum-doped lithium lanthanum zirconium oxide (LLZTO) solid state electrolyte powder (the content of sulfur is 11.11 mol %) obtained in the aforementioned Embodiment 2. The weight percentage of the sulfur-doped tantalum-doped lithium lanthanum zirconium oxide (LLZTO) solid state electrolyte powder to ETPTA was 50 wt %:50 wt %.

Example 3

The solid state battery of Example 3 was manufactured according to the manufacturing process similar to that of Example 1, and the difference therebetween is that, in Example 3, the solid state electrolyte layer in the solid state battery was composed of the sulfur-doped tantalum-doped lithium lanthanum zirconium oxide (LLZTO) solid state electrolyte powder (the content of sulfur is 33.33 mol %) obtained in the aforementioned Embodiment 3. The weight percentage of the sulfur-doped tantalum-doped lithium lanthanum zirconium oxide (LLZTO) solid state electrolyte powder to ETPTA was 20 wt %:80 wt %.

Example 4

The solid state battery of Example 4 was manufactured according to the manufacturing process similar to that of Example 1, and the difference therebetween is that, in Example 4, the solid state electrolyte layer in the solid state battery was composed of the sulfur-doped lithium lanthanum zirconium oxide (LLZO) solid state electrolyte powder (the content of sulfur is 5.73 mol %) obtained in the aforementioned Embodiment 4. The weight percentage of the sulfur-doped lithium lanthanum zirconium oxide (LLZO) solid state electrolyte powder to ETPTA was 20 wt %:80 wt %.

Comparative Example 1

The solid state battery of Comparative example 1 was manufactured according to the manufacturing process similar to that of Example 1, and the difference therebetween is that, in Comparative example 1, the solid state electrolyte layer in the solid state battery was composed of the sulfur-undoped tantalum-doped lithium lanthanum zirconium oxide (LLZTO) solid state electrolyte powder (without sulfur) obtained in the aforementioned Comparative embodiment 1. The weight percentage of the sulfur-undoped tantalum-doped lithium lanthanum zirconium oxide (LLZTO) solid state electrolyte powder to ETPTA was 30 wt %:70 wt %.

Comparative Example 2

The solid state battery of Comparative example 2 was manufactured according to the manufacturing process similar to that of Example 1, and the difference therebetween is that, in Comparative example 2, the solid state electrolyte layer in the solid state battery was composed of the sulfur-undoped lithium lanthanum zirconium oxide (LLZO) solid state electrolyte powder (without sulfur) obtained in the aforementioned Comparative embodiment 2. The weight percentage of the sulfur-undoped lithium lanthanum zirconium oxide (LLZO) solid state electrolyte powder to ETPTA was 20 wt %:80 wt %.

Figure 4A:
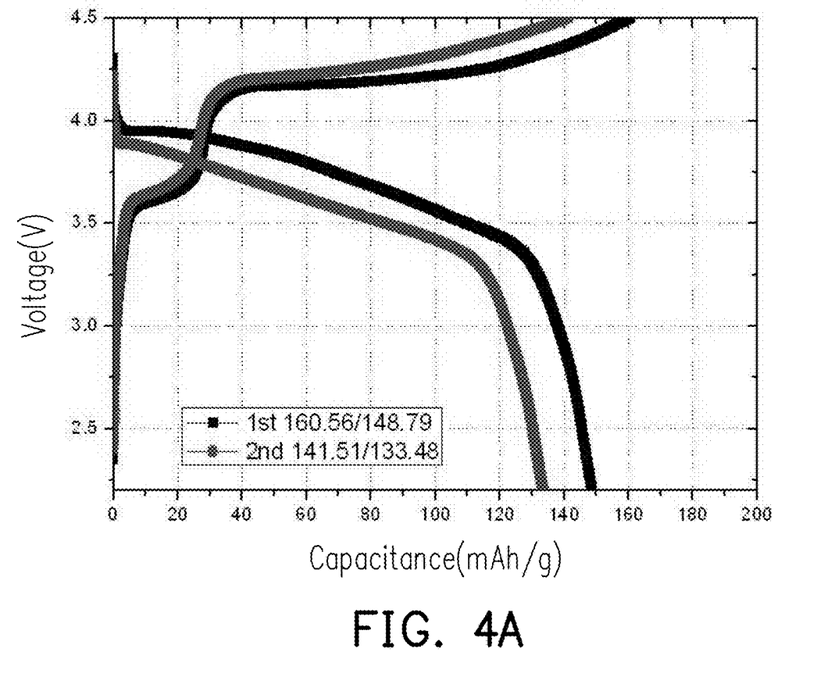
FIG. 4A to FIG. 4D are capacitance-voltage (C-V) curve diagrams of the solid state batteries of Example 1 to Example 4 of the disclosure respectively.
Figure 4B:
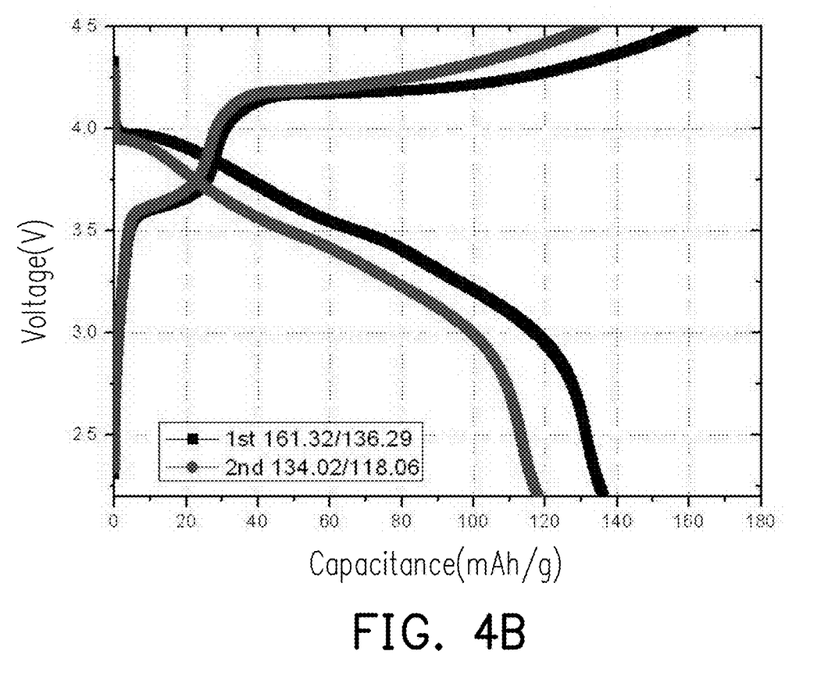
Figure 4C:
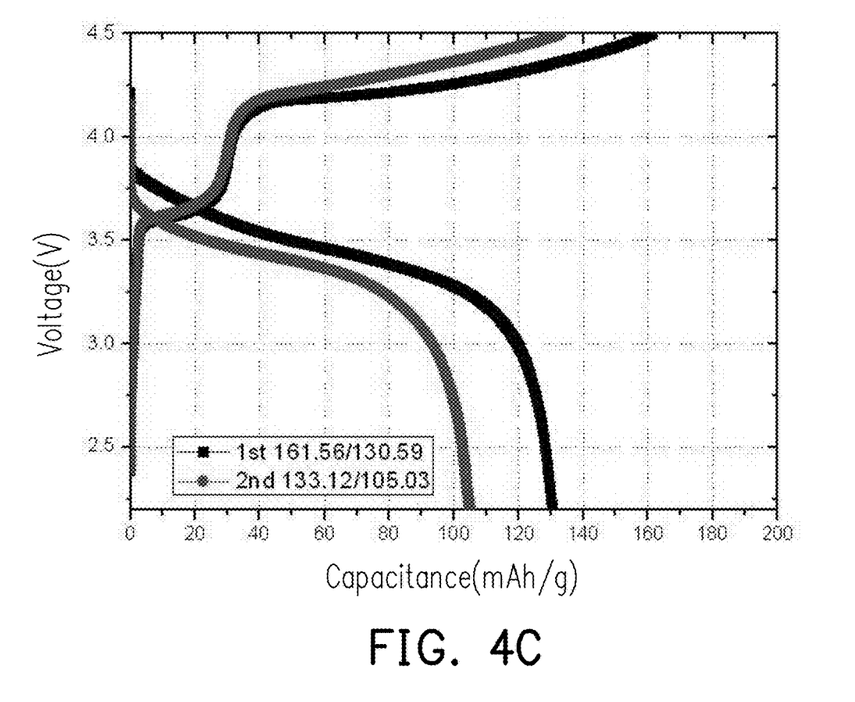
Figure 4D:
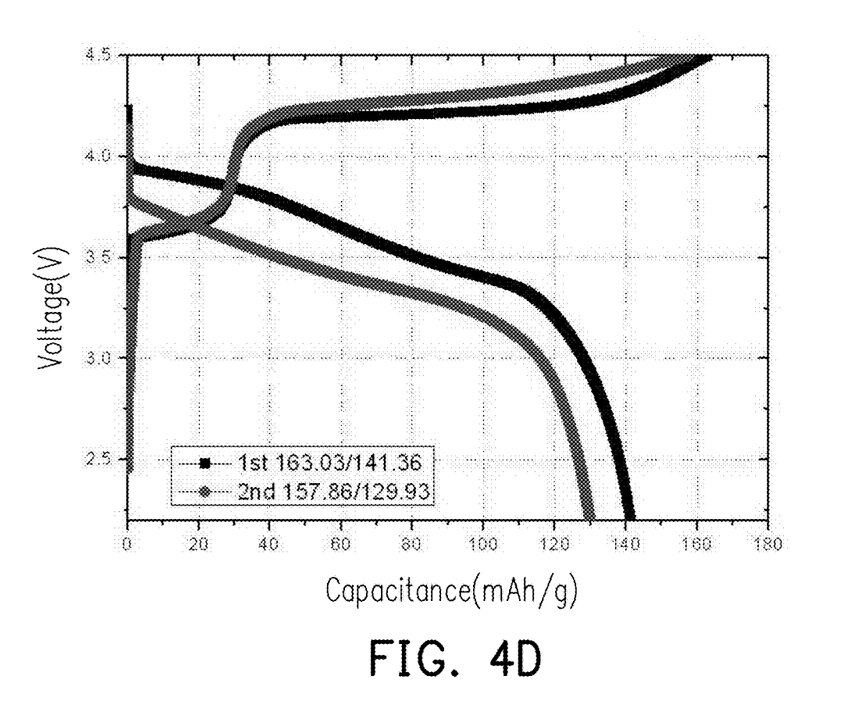
Figure 5A:
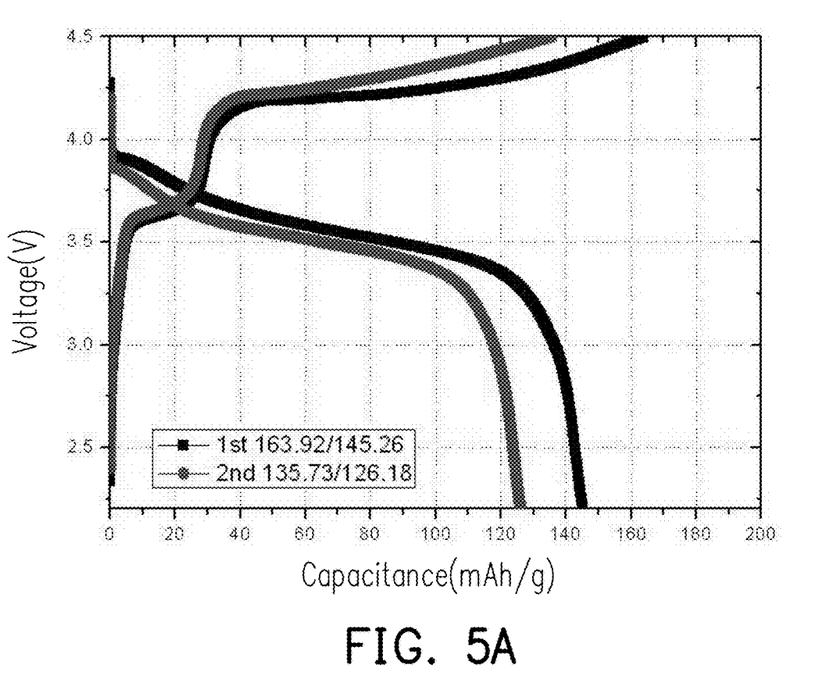
FIG. 5A and FIG. 5B are capacitance-voltage curve diagrams of the solid state batteries of Comparative example 1 and Comparative example 2 of the disclosure respectively.
Figure 5B:
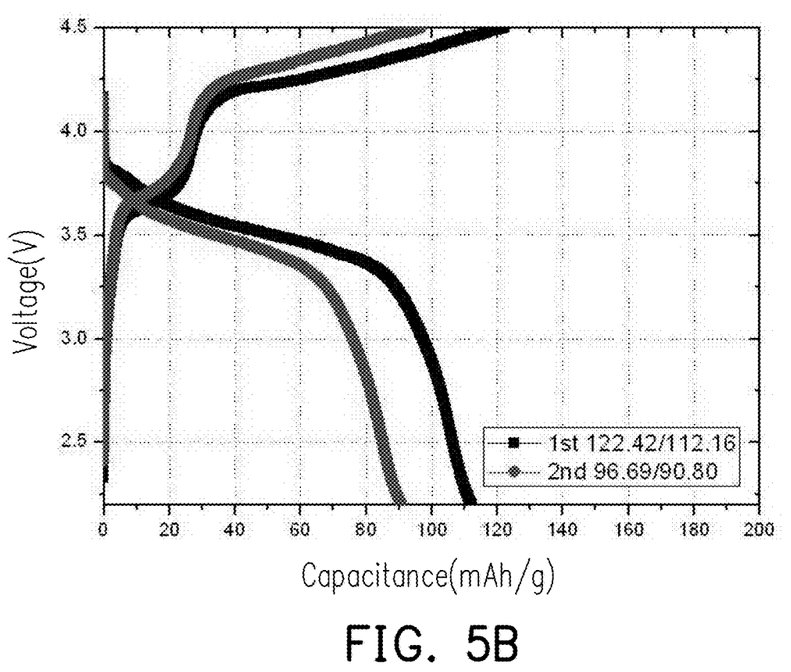

According to the results shown in FIG. 4A and FIG. 5A, compared with the solid state battery composed of the sulfur-undoped tantalum-doped lithium lanthanum zirconium oxide (LLZTO), the solid state battery composed of the sulfur-doped tantalum-doped lithium lanthanum zirconium oxide (LLZTO) has better electrical performance. Similarly, according to the results shown in FIG. 4D and FIG. 5B, compared with the solid state battery composed of the sulfur-undoped lithium lanthanum zirconium oxide (LLZO), the solid state battery composed of the sulfur-doped lithium lanthanum zirconium oxide (LLZO) has better electrical properties. In other words, the solid state battery composed of the sulfur-doped solid state electrolyte has better discharge capacitance than the solid state battery composed of the sulfur-undoped solid state electrolyte. It should be noted that, it is necessary to dope the appropriate amount of sulfur in the solid state electrolyte, the overall electrical performance of the solid state battery can be improved. Too much or too low doping amount cannot effectively improve the electrical performance of the solid state battery. Especially, excessive doping amount may cause the powder of the solid state electrolyte to be sensitive to the humidity in the environment, which will increase the difficulty of processing and is not conducive to the preparation of the solid state battery.

In summary, in the solid state electrolyte of the disclosure, by doping an appropriate amount of sulfur, the migration rate of the lithium ions in the solid state electrolyte can be improved, and the problem of poor conductivity of the conventional solid state electrolyte due to the grain boundary hindrance can be solved. Thereby, the conductivity of the solid state electrolyte is improved. At the same time, the solid state electrolyte can still maintain good chemical stability. On the other hand, the solid state electrolyte of the disclosure is applied to the solid state battery, the overall electrical performance of the solid state battery can also be improved, and the practical purpose of the solid state electrolyte can be achieved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A solid state electrolyte having a garnet type crystal structure, wherein a chemical composition of the solid state electrolyte comprises lithium, lanthanum, zirconium, oxygen, and sulfur, and a content of sulfur in the solid state electrolyte is between 5 mol % and 35 mol % based on a content of oxygen in the solid state electrolyte,
wherein the solid state electrolyte having a chemical formula represented by formula 1:

$M_{7-x}M'_3M''_{2-x}M'''_xO_{12-y}S_y$   formula 1, wherein M is lithium, M' is lanthanum, M'' is zirconium, M''' is tantalum, barium, gallium, or aluminum, $0 < x \leq 0.5$, and $y = 0.6$ to $3$.

2. The solid state electrolyte according to claim 1, wherein the solid state electrolyte is a sulfur-doped oxide solid state electrolyte.

3. The solid state electrolyte according to claim 1, wherein sulfur in the solid state electrolyte is distributed in a crystal grain of the solid state electrolyte.

4. The solid state electrolyte according to claim 1, wherein the solid state electrolyte is in powder form.

5. The solid state electrolyte according to claim 4, wherein a particle size of the solid state electrolyte is between 3 μm and 10 μm.

6. The solid state electrolyte according to claim 1, wherein a conductivity of the solid state electrolyte is between $10^{-4}$ S/cm and $10^{-3}$ S/cm.

7. A solid state battery, comprising:
a positive electrode layer;
a negative electrode layer; and
a solid state electrolyte layer, disposed between the positive electrode layer and the negative electrode layer, wherein the solid state electrolyte layer comprises the solid state electrolyte according to claim 1.

8. The solid state battery according to claim 7, wherein the solid state electrolyte layer further comprises a binder or an organic solid state electrolyte.

9. The solid state battery according to claim 8, wherein a conductivity of the solid state electrolyte layer is between $8 \times 10^{-5}$ S/cm and $10^{-3}$ S/cm.

10. The solid state battery according to claim 8, wherein the binder comprises polyvinylidene difluoride, polytetrafluoroethylene, or a combination thereof.

11. The solid state battery according to claim 8, wherein the organic solid state electrolyte comprises poly(ethylene oxide), polyphenylene oxide, polysiloxane, acrylate, or a combination thereof.

12. The solid state battery according to claim 7, wherein at least one of the positive electrode layer and the negative electrode layer comprises the solid state electrolyte.

13. The solid state battery according to claim 7, wherein the solid state electrolyte is a sulfur-doped oxide solid state electrolyte.

14. The solid state battery according to claim 7, wherein sulfur in the solid state electrolyte is distributed in a crystal grain of the solid state electrolyte.

15. The solid state battery according to claim 7, wherein the solid state electrolyte is in powder form.

16. The solid state battery according to claim 15, wherein a particle size of the solid state electrolyte is between 3 μm and 10 μm.

17. The solid state battery according to claim 7, wherein a conductivity of the solid state electrolyte is between $10^{-4}$ S/cm and $10^{-3}$ S/cm.

* * * * *